April 9, 1963 W. J. HIGGINS 3,084,966
CARGO CONTAINER
Filed Jan. 18, 1961 4 Sheets-Sheet 1

INVENTOR.
WILLIAM J. HIGGINS
BY
Louis B. Applebaum
ATTORNEY

April 9, 1963 W. J. HIGGINS 3,084,966
CARGO CONTAINER

Filed Jan. 18, 1961 4 Sheets-Sheet 4

INVENTOR.
WILLIAM J. HIGGINS
BY
Louis B. Appleton
ATTORNEY

United States Patent Office 3,084,966
Patented Apr. 9, 1963

3,084,966
CARGO CONTAINER
William J. Higgins, 12 Capp St., Carteret, N.J.
Filed Jan. 18, 1961, Ser. No. 83,594
1 Claim. (Cl. 294—77)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in containers, and more particularly pertains to improvements in cargo containers for the external transport of cargo by helicopter, and for like uses.

Nets that are adapted to be opened to serve as a sling container for holding miscellaneous articles are particularly useful for marine and air lift operations. For example, such nets can be used in suspension underneath a helicopter for transporting a palletized load from one position to another, or can be attached to a parachute for dropping a load from an aircraft at a selected location. For such purposes, it is desirable to provide a net construction that is not only capable of adapting itself to various shaped loads, but which is also strong and rugged and capable of being collapsed when not in use to permit storage in a restricted space. Such nets should also be relatively low in weight in order to prevent serious encroachment upon the limited load carrying capabilities of aircraft.

A principal object of this invention is to provide a cargo container especially adapted for use in the external transport of cargo by helicopter.

Another object is to provide a light weight, strong, durable, quick loading and unloading, collapsible cargo net having a simple hoist attachment.

Other objects and many of the attendant advantages of this invention will be readily appreciated as the same becomes better understood by reference to the following detailed description when considered in connection with the accompanying drawings wherein:

FIG. 4 is a perspective view of the cargo container of FIG. 2, showing the complete assembly encasing a load.

Similar numerals refer to similar parts throughout the several views.

Figure 1:
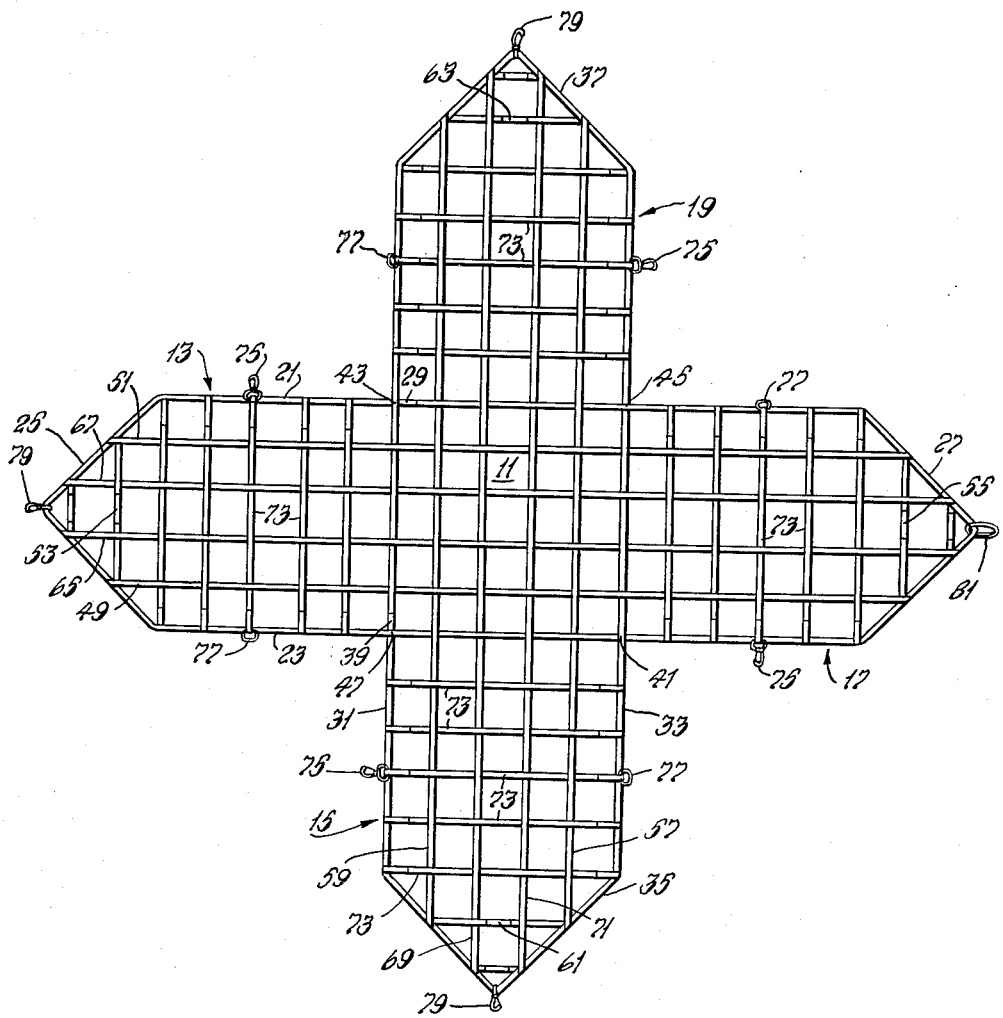
FIG. 1 is a plan view of a cargo container, showing a preferred embodiment of the invention.

The cargo container of FIG. 1 comprises slotted webbing formed into a lattice of a central rectangle 11 having integral wings 13, 15, 17 and 19 extending from each edge of the rectangle 11. Such lattice is constructed as follows:

A first course of slotted webbing is laid, flat, to form a frame consisting of spaced parallel sides 21 and 23 joined by V-shaped opposite wings 25 and 27, such first course being adapted to have its ends overlapped at 29. A second course of slotted webbing is laid, flat, to form a second frame of the same size and shape as the first frame, consisting of parallel sides 31 and 33 joined by V-shaped opposite wings 35 and 37, such second course being adapted to have its ends overlapped at 39. The second course is oriented normal to the orientation of the first course, as shown. The first and second courses are united by passing the first course through slots of the second course at points 41 and 43, and by passing the second course through slots of the first course at points 45 and 47.

Similarly, body courses of the net are then formed. Third and fourth courses 49 and 51 pass through slots in the first and second courses and have their ends 53 and 55 each overlapped and stitched to complete a loop; fifth and sixth courses 57 and 59 pass through slots in the first and second courses and have their ends 61 and 63 each overlapped and stitched to complete a loop. Seventh, eighth, ninth and tenth courses 65, 67, 69 and 71 respectively are paired in like fashion, with the ends of each pair overlapped. Further, in the assembly of the cargo container, the first to tenth courses are so interlaced as to each pass through a slot of every second crossing course that lies normal to the length of the course. In the case of the angularly disposed portions of the first and second courses, each of the third to tenth courses passes through a slot thereof.

To complete the interlace, courses 73 bridge parallel sides of the first course, and other courses 73 bridge parallel sides of the second course, at spaced intervals. Each of said bridging courses 73 is passed through a slot of every second crossing frame or body course, and every crossing frame or body course is passed through a slot of every second bridging course, as shown.

Preferably, either every or selected points of interlace are stitched together, to further limit relative displacement of courses and to further contribute to structural integrity.

Securing means such as hooks 75 and mating rings 77 are attached to adjacent sides of the first and second courses, preferably midway of the length of the wings. When a load is placed upon the central rectangle 11, the joining of the hooks and their respective mating rings forms upstanding side members, encasing the load. Securing means such as hooks 79 affixed at the apices of three of the wings can then be attached to a hoisting link 81 that is carried on the apex of the fourth wing to complete encasement of a load seated on the rectangle 11.

Figure 2:
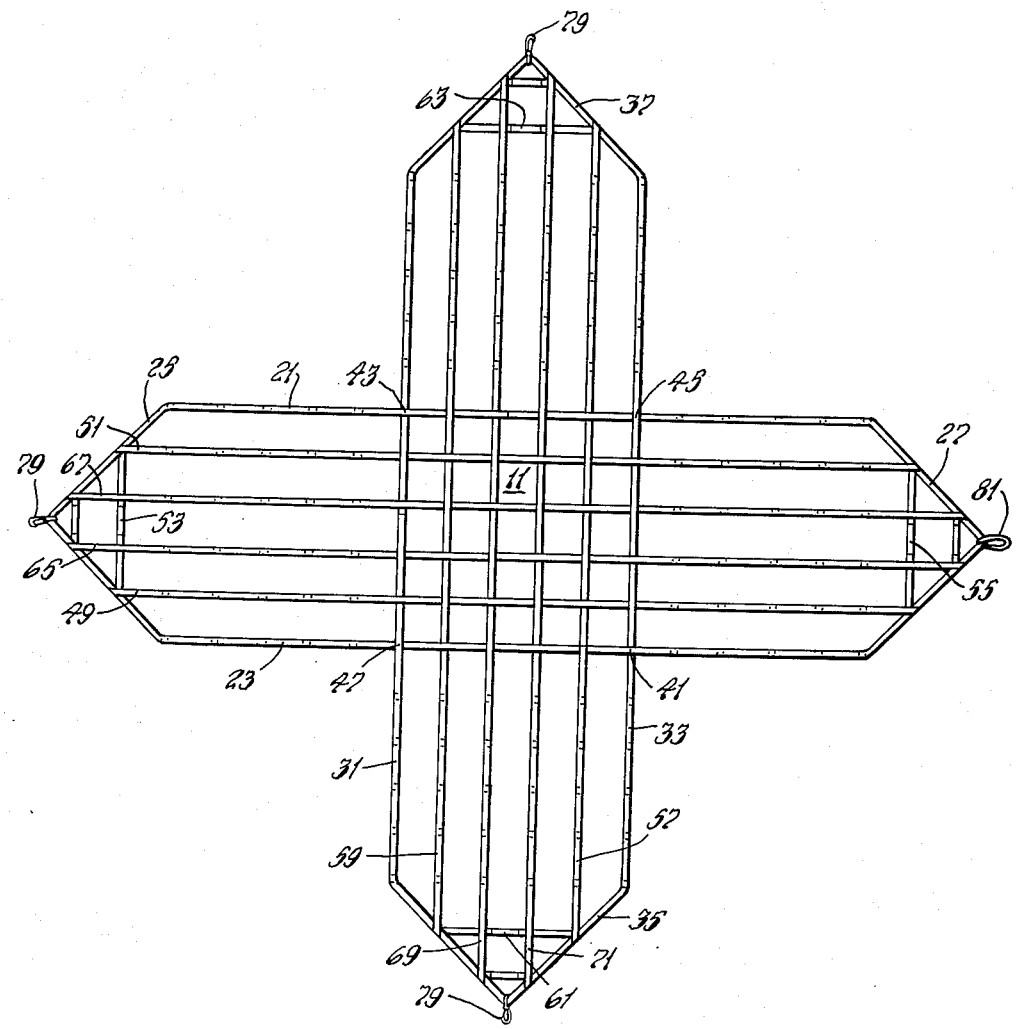
FIG. 2 is a plan view of a modified form of cargo container, showing a stage in assembly thereof.
Figure 3:
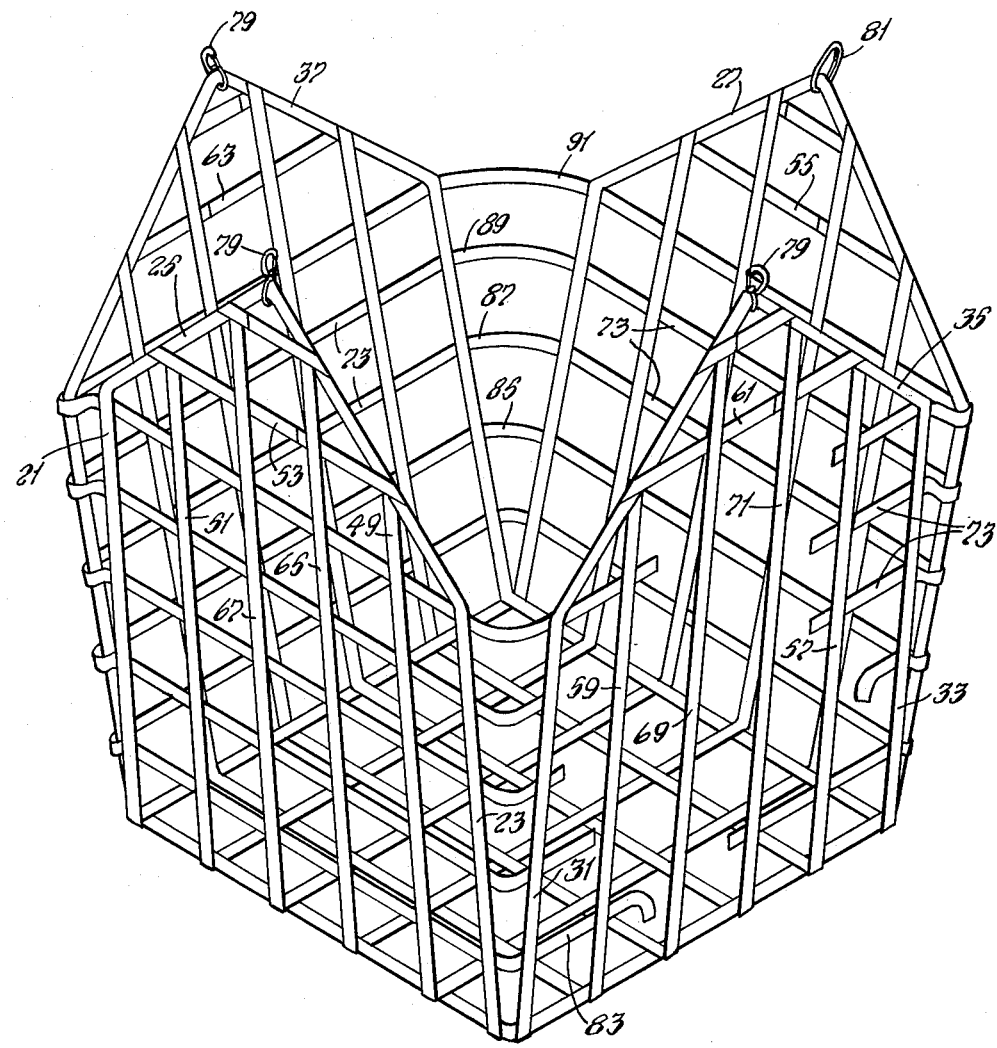
FIG. 3 is a perspective view of the cargo container of FIG. 2, showing a further stage in assembly thereof.
Figure 2:
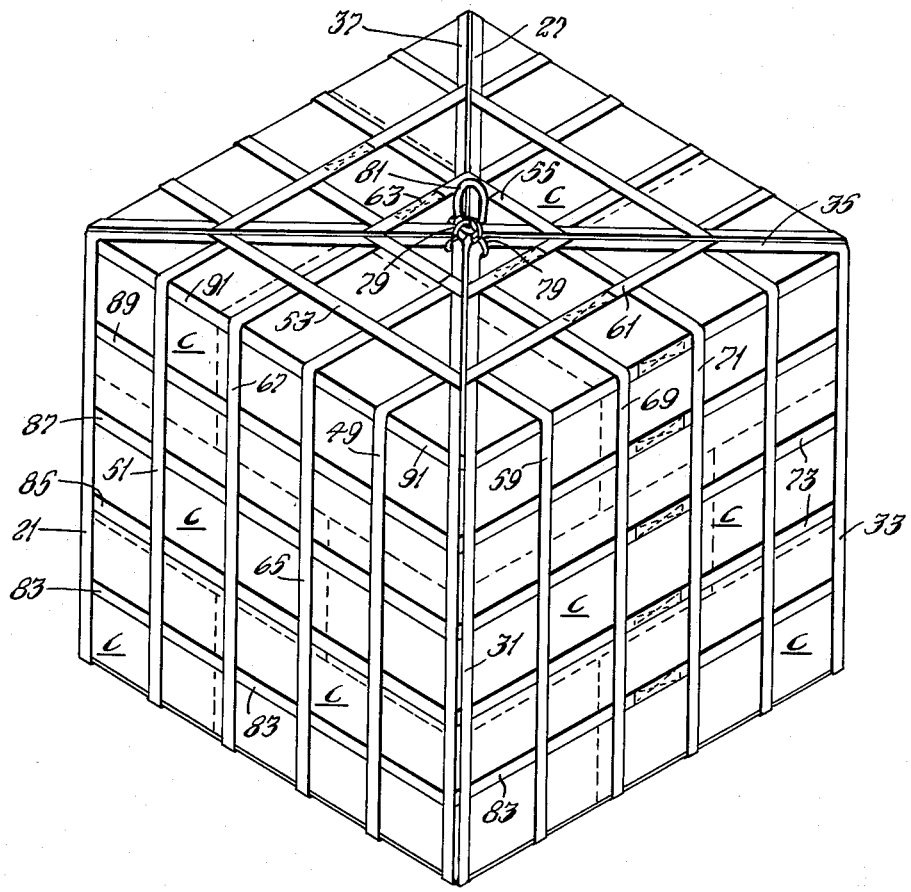

In the embodiment of the invention shown in FIG. 2, the structure is the same as that shown in FIG. 1 except that the bridging course 73 and the hooks 75 and rings 77 are not employed. In lieu thereof, as shown in FIGS. 3 and 4, single courses 83, 85, 87, 89 and 91 are passed through, and are passed through by, each second course of the frame courses and the interior courses above described, thus permitting the courses 83, 85, 87, 89 and 91 to each circumnavigate the wings 13, 15, 17 and 19. As shown in FIGS. 3 and 4, the two ends of the courses 83, 85, 87, 89 and 91 are then lapped over each other and secured together to complete the box formed. Hooks and a hoisting link, as in the embodiment shown in FIG. 1, are secured to the apices of the wings, so that such apices can be drawn together to complete encasement of cargo such as a cubed load of containers C.

Obviously many modifications and variations of the present invention are possible in the light of the above teachings. It is therefore to be understood that within the scope of the appended claim the invention may be practiced otherwise than as specifically described.

I claim:

A netting framework for a cargo container having a rectangular cross-section comprising:

a first course of slotted webbing defining a substantially elongated hexagonal frame;

a second course of slotted webbing defining a substantially elongated hexagonal frame, the body portion of each of said frames intersecting each other to define a central rectangular load-receiving platform and four wings, the body portion of each of said wings defining a rectangular configuration and the end portion of each of said wings defining a triangular configuration,
the total area of said end portions being substantially equal to the area of said rectangular load receiving platform, said course of each of said frames alternately passing through slots in the course of the other of said frames;

a hoisting link secured at the apex of one of said triangular portions of said wings;

a plurality of rings, each of which is secured at the apices of each of the other triangular portions of said wings;

a plurality of body courses, each of which defines a substantially rectangular frame,
each of said frames positioned within the area circumscribed by each of said hexagonal frames,
each of the corners of said rectangular frames secured to an adjacent apexing side of said triangular portion of said wings,
each of said body courses alternately passing through slots in intersecting courses;

a plurality of bridging courses spanning the outermost sides of each of said wings,
each of said bridging courses alternately passing through slots in intersecting courses.

References Cited in the file of this patent

UNITED STATES PATENTS

| | | |
|---|---|---|
| 1,188,185 | Krulish | June 20, 1916 |
| 1,365,511 | Lee | Jan. 11, 1921 |
| 2,827,325 | Pugh | Mar. 18, 1958 |
| 2,925,141 | Frieder et al. | Feb. 16, 1960 |
| 2,991,539 | Higgins | July 11, 1961 |
| 3,011,820 | Frieder et al. | Dec. 5, 1961 |

FOREIGN PATENTS

| | | |
|---|---|---|
| 230,678 | Australia | Oct. 6, 1960 |
| 288,862 | Italy | Sept. 25, 1931 |